US011196279B2

(12) United States Patent
Krishnakumar et al.

(10) Patent No.: US 11,196,279 B2
(45) Date of Patent: Dec. 7, 2021

(54) SYSTEM AND METHOD OF UTILIZING A BATTERY

(71) Applicant: Dell Products L.P., Round Rock, TX (US)

(72) Inventors: Karthikeyan Krishnakumar, Austin, TX (US); Richard Christopher Thompson, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 189 days.

(21) Appl. No.: 16/776,832

(22) Filed: Jan. 30, 2020

(65) Prior Publication Data

US 2021/0242688 A1   Aug. 5, 2021

(51) Int. Cl.
*H02J 7/00* (2006.01)

(52) U.S. Cl.
CPC ............ *H02J 7/007* (2013.01); *H02J 7/0013* (2013.01)

(58) Field of Classification Search
CPC .. H02J 7/007; H02J 7/0013; H02J 7/04; H02J 7/0069; H02J 2007/067
USPC ................... 320/124, 130, 134, 135
See application file for complete search history.

(56) References Cited

U.S. PATENT DOCUMENTS

| 9,694,704 B2* | 7/2017 | Morita ................... H02J 7/007 |
| 2016/0190827 A1* | 6/2016 | Ezawa ................... H02J 7/007 |
| | | 320/107 |

* cited by examiner

*Primary Examiner* — Paul Dinh
(74) *Attorney, Agent, or Firm* — Baker Botts L.L.P.

(57) ABSTRACT

In one or more embodiments, one or more systems, methods, and/or processes may: charge a battery from a first end of discharge (EOD) voltage to a first voltage; discharge the battery to a second EOD voltage; in response to discharging the battery to the second EOD voltage, withhold power from one or more cells of the battery to at least one component of a system; charge, from the second EOD voltage to a second voltage, greater than the second voltage and less than the first voltage; discharge the battery to a third EOD voltage; in response to discharging the battery to the third EOD voltage, withhold power from the one or more cells to the at least one component; charge, from the third EOD voltage to a third voltage, greater than or equal to the second EOD voltage; and discharge the battery to the first EOD voltage.

20 Claims, 7 Drawing Sheets

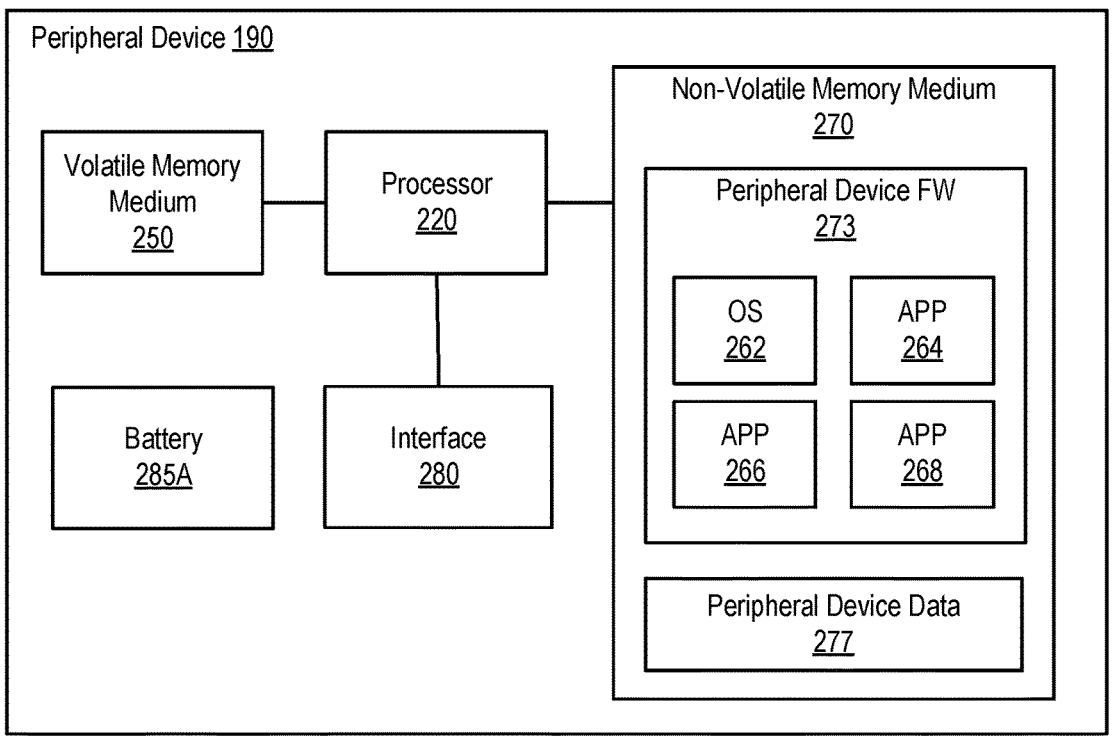
FIG. 2A
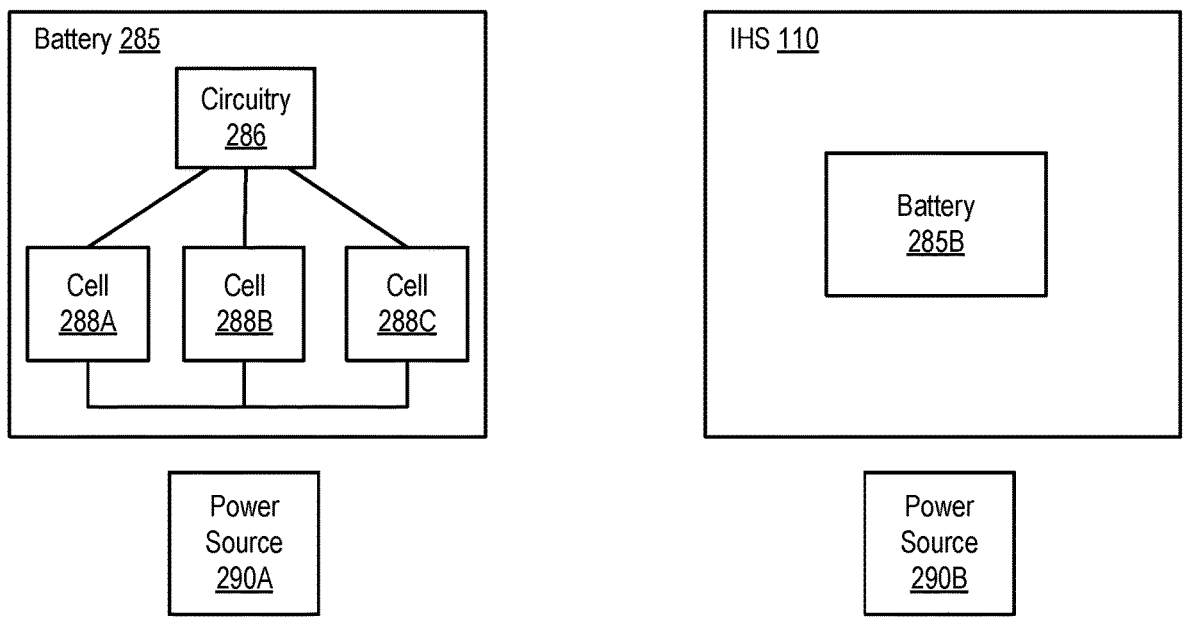
FIG. 2B  FIG. 2C

SYSTEM AND METHOD OF UTILIZING A BATTERY

BACKGROUND

Field of the Disclosure

This disclosure relates generally to information handling systems and more particularly to utilizing batteries of peripheral devices associated with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may charge a battery from a first end of discharge voltage to a first voltage; may discharge the battery to a second end of discharge voltage, greater than the first end of discharge voltage; in response to discharging the battery to the second end of discharge voltage, may withhold power from one or more cells of the battery to at least one component of a system; may charge, from the second end of discharge voltage to a second voltage, greater than the second end of discharge voltage and less than the first voltage; may discharge the battery to a third end of discharge voltage, less than the second end of discharge voltage and greater than the first end of discharge voltage; in response to discharging the battery to the third end of discharge voltage, may withhold power from the one or more cells to the at least one component of the system; may charge, from the third end of discharge voltage to a third voltage, greater than or equal to the second end of discharge voltage; and may discharge the battery to the first end of discharge voltage. In one or more embodiments, the system may be a peripheral device. In one or more embodiments, the system may be an information handling system.

In one or more embodiments, one or more systems, one or more methods, and/or one or more processes may charge, from a first end of discharge voltage to a first voltage, the battery; may discharge the battery to a second end of discharge voltage, greater than the first end of discharge voltage; in response to discharging the battery to the second end of discharge voltage, may cease at least one function of a system; may charge, from the second end of discharge voltage to a second voltage, greater than the second end of discharge voltage and less than the first voltage; may discharge the battery to a third end of discharge voltage, less than the second end of discharge voltage and greater than the first end of discharge voltage; in response to discharging the battery to the third end of discharge voltage, may cease the at least one function of the system; may charge, from the third end of discharge voltage to a third voltage, greater than or equal to the second end of discharge voltage; and may discharge the battery to the first end of discharge voltage.

In one or more embodiments, circuitry of the battery may include a battery management unit. For example, the battery management unit may be configured to: measure a first present voltage; determine that the first present voltage is the second end of discharge voltage or the third end of discharge voltage; and in response to determining that the first present voltage is the second end of discharge voltage or the third end of discharge voltage, withhold power from one or more cells of the battery to at least one component of a system. In one or more embodiments, the first present voltage may be the second end of discharge voltage. For example, the battery management unit may be further configured to: measure a second present voltage of the battery; determine that the second present voltage is the second voltage; and in response to determining that the second present voltage is the second voltage, permit the battery to provide power the at least one component of the system.

In one or more embodiments, the one or more cells of the battery may include respective one or more lithium-ion cells. For example, the one or more systems, one or more methods, and/or one or more processes may further: measure a first present voltage of the one or more; determine that the first present voltage is the first end of discharge voltage; and withhold power from the one or more lithium-ion cells to the at least one component of the system to prevent damage to the one or more lithium-ion cells. In one or more embodiments, the one or more systems, one or more methods, and/or one or more processes may further: determine that a present voltage of the battery is the second end of discharge voltage; and in response to determining that the present voltage of the battery is the second end of discharge voltage, indicate that the system needs to be coupled to a power source.

In one or more embodiments, a battery may include one or more cells and circuitry coupled to the one or more cells. In one example, the battery may provide power to an information handling system. In another example, the battery may provide power to a peripheral device associated with an information handling system. In one or more embodiments, the circuitry may charge the battery from a first end of discharge voltage to a first voltage; may discharge the battery to a second end of discharge voltage, greater than the first end of discharge voltage; in response to discharging the battery to the second end of discharge voltage, may withhold power from the one or more cells to at least one component of a system; may charge, from the second end of discharge voltage to a second voltage, greater than the second end of discharge voltage and less than the first voltage; may discharge the battery to a third end of discharge voltage; in response to discharging the battery to the third end of discharge voltage, may withhold power from the one or more cells to the at least one component of the system; may charge, from the third end of discharge voltage to a third voltage, greater than or equal to the second end of discharge voltage; and may discharge the battery to the first end of discharge voltage.

In one or more embodiments, the circuitry may further determine that a present voltage of the battery is the second end of discharge voltage. For example, the circuitry may further determine indicate that the system needs to be coupled to a power source in response to determining that the present voltage of the battery is the second end of discharge voltage. In one or more embodiments, the circuitry may include a battery management unit. For example, the battery management unit may measure a first present voltage; may determine that the first present voltage is the second end of discharge voltage or the third end of discharge voltage; and in response to determining that the first present voltage is the second end of discharge voltage or the third end of discharge voltage, may withhold power from the one or more cells to the at least one component of the system.

In one or more embodiments, the first present voltage may be the second end of discharge voltage. For example, the battery management unit may further measure a second present voltage of the battery; may further determine that the second present voltage is the second voltage; and in response to determining that the second present voltage is the second voltage, may further permit the battery to provide power the at least one component of the system. In one or more embodiments, the one or more cells include respective one or more lithium-ion cells. For example, the circuitry may further measure a first present voltage of the one or more; may further determine that the first present voltage is the first end of discharge voltage; and may further withhold power from the one or more lithium-ion cells to the at least one component of the system. For instance, the circuitry may withhold power from the one or more lithium-ion cells to the at least one component of the system to prevent damage to the one or more lithium-ion cells.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 2A illustrates an example of peripheral device, according to one or more embodiments;

FIG. 2B illustrates an example of a battery, according to one or more embodiments;

FIG. 2C illustrates another example of an information handling system that includes a battery, according to one or more embodiments;

DETAILED DESCRIPTION

Figure 1:
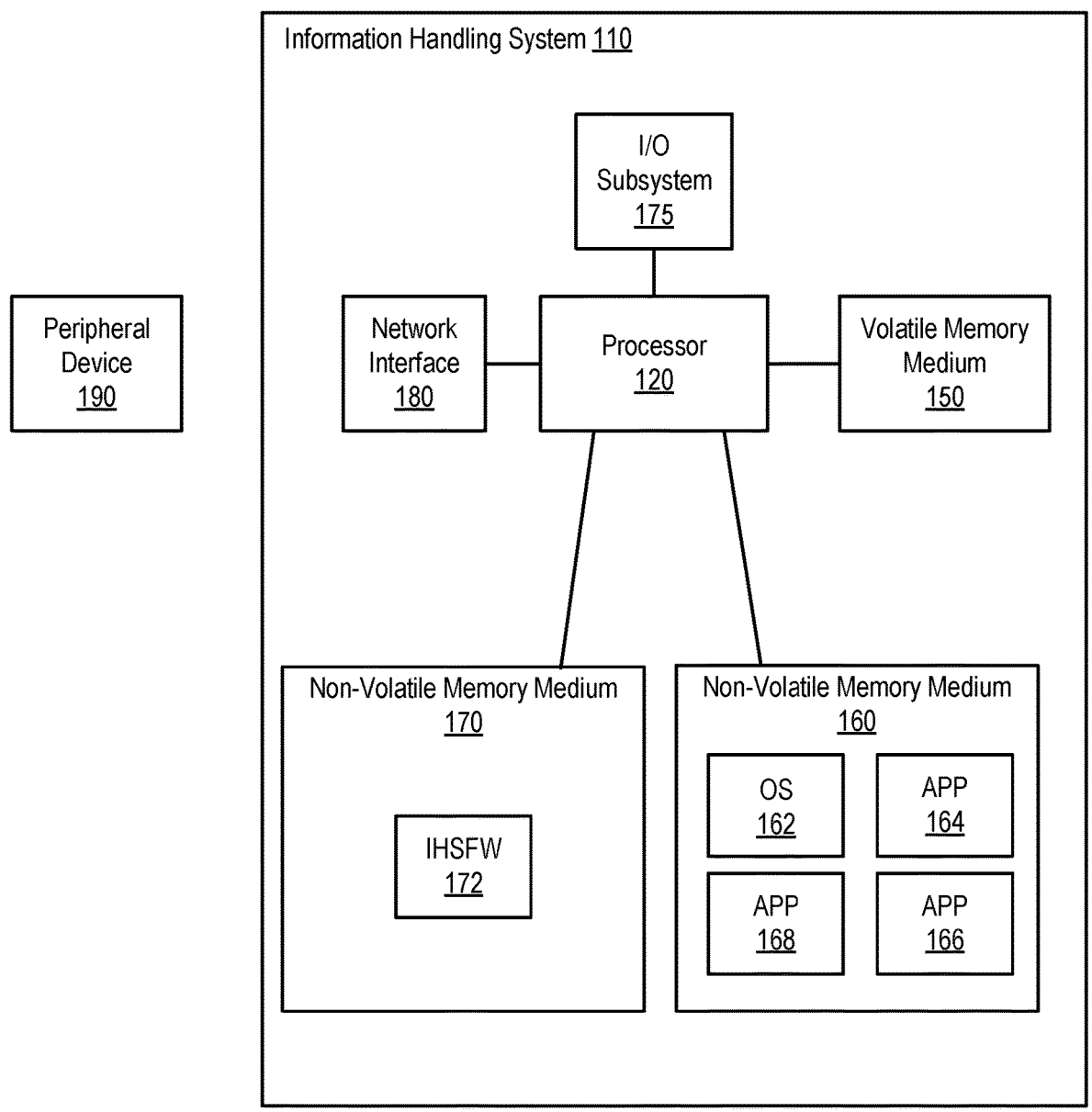
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a user may have a need to rapidly charge a device (e.g., a peripheral device). For example, the device may be charged ten to thirty seconds. For instance, the device may be utilized for about thirty minutes after it is charged ten to thirty seconds. In one or more embodiments, this may not be a normal mode of operation, but there may be instances where the user wants to utilize the device but discovers that there is no charge for utilization remaining in the device. In one or more embodiments, a high capacity capacitor (e.g., a "supercapacitor", an "ultracapacitor", etc.) may be charged before a battery of the device. For example, the high capacity capacitor may be rapidly charged. For instance, the high capacity capacitor may be charged ten to thirty seconds and may provide power to the device for about thirty minutes after it is charged ten to thirty seconds.

In one or more embodiments, a high capacity capacitor may have a capacitance value much higher than other capacitors. For example, a high capacity capacitor may have a capacitance per volume value much higher than other capacitors. For instance, a high capacity capacitor may have a volume of three United States quarter dollar value coins and may have a capacitance of one or more Farads. In one or more embodiments, the high capacity capacitor may be charged more rapidly than a battery. In one or more embodiments, a high capacity capacitor may not utilize a conventional solid dielectric. For example, a high capacity capacitor may utilize an electrostatic double-layer capacitance and an electrochemical pseudocapacitance, which both may contribute to a total capacitance of the high capacity capacitor.

In one or more embodiments, a synthetic rapid charge capability of the device may be attained without losing a total time of normal utilization of the device. For example, the total time of normal utilization of the device may be fifteen hours. In one or more embodiments, increasing a volume of a battery of the device may provide total time of normal utilization of the device and the synthetic rapidly charge capability of the device. For example, for the additional energy storage capacity, less volume total may be utilized by increasing a volume of a battery rather than not changing the volume of the battery and adding a high capacity capacitor. In one instance, a volume of the battery may be increased by three percent (3%) to provide an additional thirty minutes of utilization of the device. In another instance, when the device is a stylus, an overall length of the stylus may be increased by three millimeters (3 mm) if a volume of the battery is increased to provide a rapid charge capability of the stylus, while the overall length of the stylus may be increased by thirty-five millimeters (35 mm) if a high capacity capacitor is utilized to provide a rapid charge capability of the stylus. In one or more embodiments, it may be advantageous to increase a volume of a battery rather than adding a high capacity capacitor to a design based at least on one or more system, one or more methods, and/or one or more processes described herein.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, PO subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, a peripheral device 190 may be coupled to IHS 110 in a wireless fashion. In one example, peripheral device 190 may be a mouse. In a second example, peripheral device 190 may be a touchpad. In another example, peripheral device 190 may be a stylus. In one or more embodiments, peripheral device 190 may wirelessly communicate the peripheral data with IHS 110. For example, peripheral device 190 may wirelessly communicate the peripheral data with IHS 110 via one or more wireless protocols. For instance, peripheral device 190 may wirelessly communicate the peripheral data with IHS 110 via one or more of an IEEE 802.11 protocol, an IEEE 802.15 protocol, a Bluetooth protocol, a ZigBee protocol, and a 6LoWPAN protocol, among others. In one or more embodiments, the peripheral data may include information indicating a mouse movement, a mouse click, a stylus movement, a stylus click, electronic accelerometer data, electronic gyroscope data, a touchpad drag, a touchpad click, etc.

Turning now to FIG. 2A, an example of peripheral device is illustrated, according to one or more embodiments. As shown, peripheral device 190 may include a processor 220, a volatile memory medium 250, a non-volatile memory medium 270, and an interface 280. As illustrated, non-volatile memory medium 270 may include a peripheral device firmware (FW) 273, which may include an OS 262 and APPs 264-268, and may include peripheral device data 277. In one example, OS 262 may be or include a real-time operating system (RTOS). In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable peripheral device 190 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface. In a fourth example, interface 280 may include wireless communication circuitry. For instance, the wireless communication circuitry may enable peripheral device to wirelessly communicate with an information handling system (e.g., IHS 110). In another example, interface 280 may include a charging interface. For instance, the charging interface may receive electrical current at a voltage. In one or more embodiments, the charging interface may include a wired charging interface. In one or more embodiments, the charging interface may include a wireless charging interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, one or more flowcharts, one or more methods, and/or one or more processes described herein. For example, non-volatile memory medium 270 and/or volatile memory medium 250 may store instructions that may be executable in accordance with at least a portion of one or more systems, flowcharts, one or more methods, and/or one or more processes described herein. In one or more embodiments, processor 220 may execute instructions in accordance with at least a portion of one or more of systems, flowcharts, methods, and/or processes described herein. For example, non-volatile memory medium 270 and/or volatile memory medium 250 may store instructions that may be executable in accordance with at least a portion of one or more of systems, flowcharts, methods, and/or processes described herein. In one or more embodiments, processor 220 may utilize peripheral device data 277. In one example, processor 220 may utilize peripheral device data 277 via non-volatile memory medium 270. In another example, one or more portions of peripheral device data 277 may be transferred to volatile memory medium 250, and processor 220 may utilize peripheral device data 277 via volatile memory medium 250.

As illustrated, peripheral device 190 may include a battery 285A. In one or more embodiments, battery 285A may provide power to components of peripheral device 190. For example, battery 285A may provide power one or more of processor 220, volatile memory medium 250, non-volatile memory medium 270, and interface 280, among others.

Turning now to FIG. 2B, an example of a battery is illustrated, according to one or more embodiments. As shown, a battery 285 may include circuitry 286. For example, battery 285 may be or include a battery system. In one or more embodiments, circuitry 286 may include a battery management unit (BMU). In one or more embodiments, circuitry 286 may include a processor. For example, circuitry 286 may include a memory medium that stores instructions executable by the processor of circuitry 286. For instance, circuitry 286 may include a microcontroller. In one or more embodiments, circuitry 286 may be configured to implement at least a portion of one or more systems, one or more flowcharts, one or more methods, and/or one or more processes described herein. For example, the processor of circuitry 286 may execute processor instructions in accordance with at least a portion of one or more systems, one or more flowcharts, one or more methods, and/or one or more processes described herein.

As illustrated, battery 285 may include cells 288A-288C. In one or more embodiments, a cell 288 may include a lithium-ion (Li-ion) cell. As shown, cells 288A-288C may be coupled to one another. In one or more embodiments, cells 288A-288C may be coupled to one another to provide a current greater than a single cells 288 may provide. In one or more embodiments, cells 288A-288C may be coupled to one another to provide a voltage greater than a single cells 288 may provide. Although battery 285 is illustrated with multiple cells 288, battery 285 may include a single cell 288, according to one or more embodiments.

As illustrated, circuitry 286 may be coupled to cells 288. In one or more embodiments, circuitry 286 may determine a voltage associated with a cell 288. In one or more embodiments, circuitry 286 may determine a charging current associated with a cell 288. In one or more embodiments, circuitry 286 may determine a discharging current associated with a cell 288.

In one or more embodiments, circuitry 286 may regulate one or more egresses of power from one or more of cells 288A-288C. For example, circuitry 286 may regulate power transferred from one or more of cells 288A-288C to one or more components of peripheral device 190. In one or more embodiments, circuitry 286 may regulate one or more ingresses of power to one or more of cells 288A-288C. For example, circuitry 286 may regulate power transferred to one or more of cells 288A-288C from a power source 290A. For instance, power source 290A may be configured to provide power to battery 285 to charge battery 285.

In one or more embodiments, battery 285 may be coupled to power source 290A. In one example, battery 285 may be coupled to power source 290A in a wired fashion. In another example, battery 285 may be coupled to power source 290A in a wireless fashion. In one or more embodiments, battery 285 may be charged by power source 290A. In one or more embodiments, battery 285 may not include circuitry 286. For example, battery 285 may include one or more cells 288 without circuitry 286.

Turning now to FIG. 2C, another example of an information handling system that includes a battery is illustrated, according to one or more embodiments. As shown, IHS 110 may include a battery 285B. In one or more embodiments, battery 285B may provide power to one or more components of IHS 110. For example, battery 285B may provide power to one or more of processor 120, volatile memory medium 150, non-volatile memory medium 160, non-volatile memory medium 170, PO subsystem 175, and network interface 175, among others. In one or more embodiments, battery 285B may provide power to peripheral device 190. For example, battery 285B may provide power to peripheral device 190. For instance, battery 285B may charge battery 285A. In one or more embodiments, IHS 110 may be coupled to power source 290B. In one example, IHS 110 may be coupled to power source 290B in a wired fashion. In another example, IHS 110 may be coupled to power source 290B in a wireless fashion. In one or more embodiments, battery 285B may be charged by power source 290B.

Figure 3A:
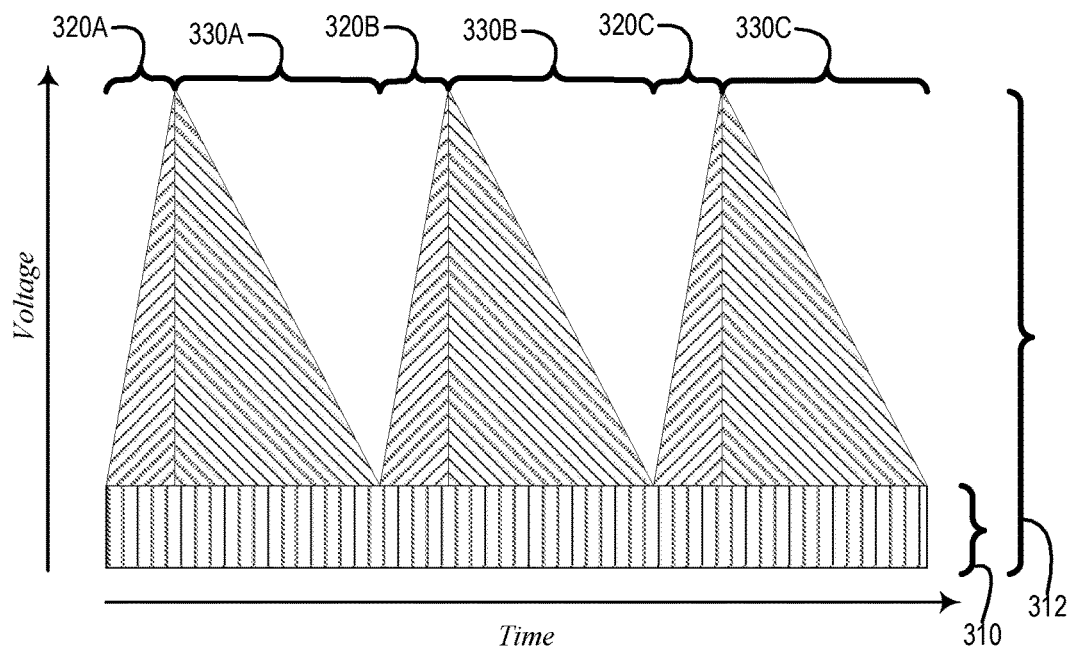
FIG. 3A illustrates an example of charging and discharging a battery of a peripheral device, according to one or more embodiments.

Turning now to FIG. 3A, an example of charging and discharging a battery of a peripheral device is illustrated, according to one or more embodiments. In one or more embodiments, battery 285 may store a charge with a voltage 310. For example, voltage 310 may be a first end of discharge voltage. For instance, the first end of discharge voltage may be a first minimum voltage cutoff. In one or more embodiments, peripheral device 190 may not discharge battery 285 below voltage 310. In one or more embodiments, circuitry 286 may not discharge battery 285 below voltage 310. In one or more embodiments, preventing a voltage of battery 285 from dropping below the first end of discharge voltage may prevent a degradation of a cell 288 of battery 285. In one or more embodiments, preventing a voltage of battery 285 from dropping below the first end of discharge voltage may prevent damage to a cell 288 of battery 285.

As shown, battery 285 may be charged to a voltage 312 during a period of time 320A. In one or more embodiments, battery 285 may be charged to voltage 312 via power source 290. As illustrated, battery 285 may be discharged to voltage 310 during a period of time 330A. In one or more embodiments, utilizing peripheral device 190 may discharge battery 285. As shown, battery 285 may be charged to voltage 312 during a period of time 320B. As illustrated, battery 285 may be discharged to voltage 310 during a period of time 330B. As shown, battery 285 may be charged to voltage 312 during a period of time 320C. As illustrated, battery 285 may be discharged to voltage 310 during a period of time 330C.

Figure 3B:
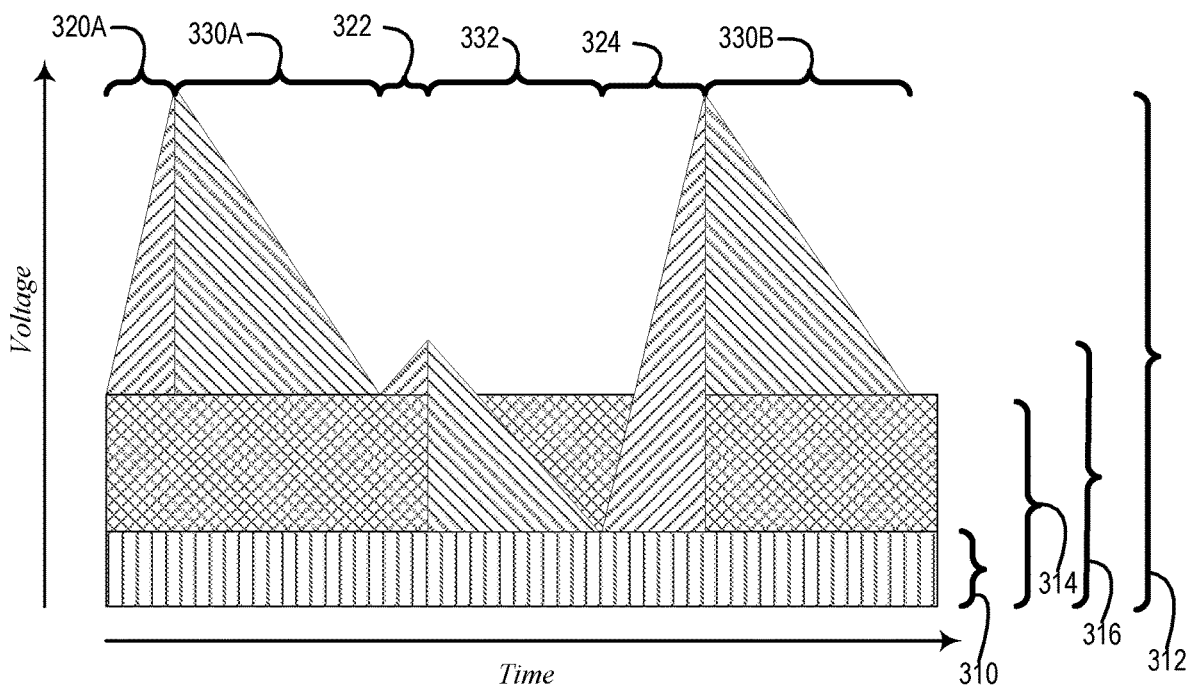
FIG. 3B illustrates an example of charging and discharging a battery, which includes a reserve, of a peripheral device, according to one or more embodiments.

Turning now to FIG. 3B, an example of charging and discharging a battery, which includes a reserve, of a peripheral device is illustrated, according to one or more embodiments. In one or more embodiments, battery 285 may be configured with an energy reserve. For example, battery 285 may be configured with bigger one or more cells that may provide the energy reserve. In one or more embodiments, the energy reserve may permit a second end of discharge voltage that is higher than the first end of discharge voltage. For example, the second end of discharge voltage may be voltage 314. For instance, voltage 314 may be higher than voltage 310. In one or more embodiments, peripheral device 190 may be utilized which may discharge battery 285 to voltage 314. When battery 285 is discharged to voltage 314, peripheral device 190 may indicate that battery 285 is out of charge, according to one or more embodiments.

As shown, battery 285 may be charged to voltage 312 during period of time 320A. As illustrated, battery 285 may be discharged to voltage 314 during period of time 330A. In one or more embodiments, after period of time 330A, peripheral device 190 may indicate that it is out of charge. In one or more embodiments, after period of time 330A, peripheral device 190 may indicate that it needs to be charged. In one or more embodiments, after period of time 330A, peripheral device 190 may no longer function as a peripheral device. In one or more embodiments, peripheral device 190 may be charged.

As shown, battery 285 may be charged to voltage 316 during a period of time 322. In one or more embodiments, charging battery 285 during period of time 322 may permit access to the energy reserve of battery 285. As illustrated, battery 285 may be discharged to voltage 310 during period of time 332. For example, battery 285 may be discharged to the first end of discharge voltage during period of time 332. As shown, battery 285 may be charged to voltage 312 during period of time 320B. As illustrated, battery 285 may be discharged to voltage 314 during period of time 330B.

Figure 3C:
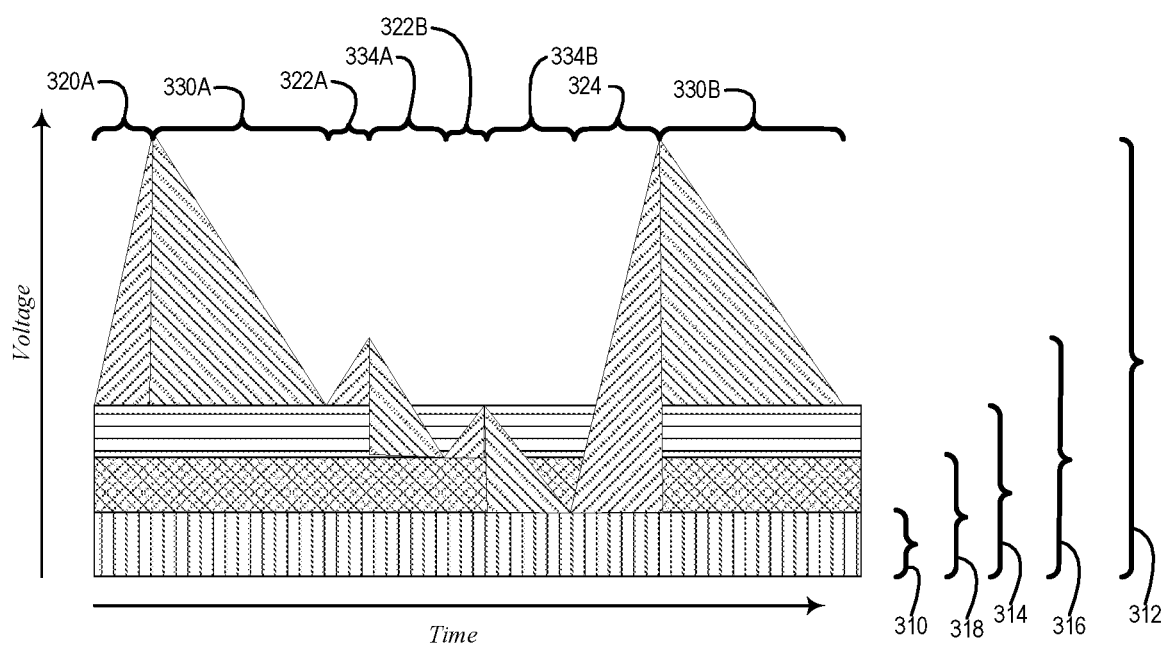
FIG. 3C illustrates another example of charging and discharging a battery, which includes a reserve, of a peripheral device, according to one or more embodiments.

Turning now to FIG. 3C, another example of charging and discharging a battery, which includes a reserve, of a peripheral device is illustrated, according to one or more embodiments. In one or more embodiments, a third end of discharge voltage may be utilized. For example, the third end of discharge voltage may be between the first end of discharge voltage and the second end of discharge voltage. For instance, the third end of discharge voltage may be a voltage 318, which may be between voltage 310 and voltage 314.

As shown, battery 285 may be charged to voltage 312 during period of time 320A. As illustrated, battery 285 may be discharged to voltage 314 during period of time 330A. In one or more embodiments, after period of time 330A, peripheral device 190 may indicate that it is out of charge. In one or more embodiments, after period of time 330A, peripheral device 190 may indicate that it needs to be charged. In one or more embodiments, after period of time 330A, peripheral device 190 may no longer function as a peripheral device. In one or more embodiments, peripheral device 190 may be charged.

As shown, battery 285 may be charged to voltage 316 during a period of time 322A. In one or more embodiments, charging battery 285 during period of time 322A may permit access to the energy reserve of battery 285. As illustrated, battery 285 may be discharged to a voltage 318 during a period of time 334A. For example, battery 285 may be discharged to the third end of discharge voltage during period of time 334A.

In one or more embodiments, after period of time 334A, peripheral device 190 may indicate that it is out of charge. In one or more embodiments, after period of time 334A, peripheral device 190 may indicate that it needs to be charged. In one or more embodiments, after period of time 334A, peripheral device 190 may no longer function as a peripheral device. In one or more embodiments, peripheral device 190 may be charged.

As shown, battery 285 may be charged to voltage 314 during a period of time 322B. In one or more embodiments, charging battery 285 during period of time 322B may permit access to the energy reserve of battery 285. As illustrated, battery 285 may be discharged to voltage 310 during a period of time 334B. For example, battery 285 may be discharged to the third end of discharge voltage during period of time 334B. As illustrated, battery 285 may be charged to voltage 312 during period of time 324. As shown, battery 285 may be discharged to voltage 314 during period of time 330B.

Although FIGS. 3A-3C are described with reference to peripheral device 190, any system may be utilized in place of peripheral device 190 in the descriptions associated with FIGS. 3A-3C, according to one or more embodiments. For example, IHS 110 may be utilized in place of peripheral device 190 in the descriptions associated with FIGS. 3A-3C.

Figure 4:
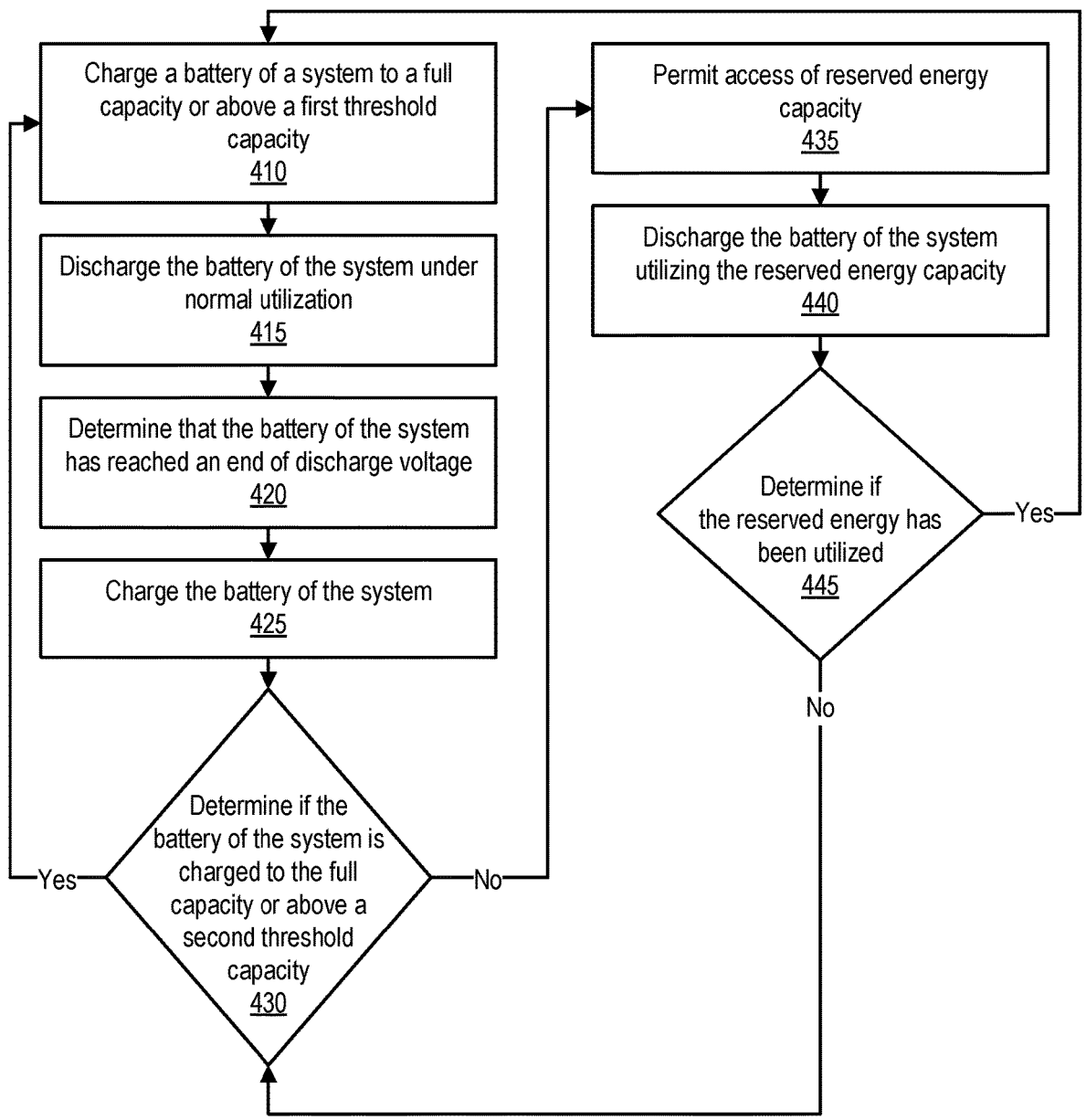
FIG. 4 illustrates an example of a method of utilizing a battery of a peripheral device, according to one or more embodiments.

Turning now to FIG. 4, an example of a method of utilizing a battery of a system is illustrated, according to one or more embodiments. At 410, a battery of a system may be charged to a full capacity or above a first threshold capacity. In one example, the system may be or include peripheral device 190. For instance, the battery of the system may be battery 285A. In another example, the system may be or include IHS 110. For instance, the battery of the system may be battery 285B. At 415, the battery of the system may be discharged under normal utilization. For example, the battery may be discharged normally. For instance, the battery may be discharged during normal utilization of the system.

At 420, it may be determined that the battery of the system has reached an end of discharge voltage. At 425, the battery of the system may be charged. In one example, the battery of the system may be charged in a wired fashion. In another example, the battery of the system may be charged in a wireless fashion.

At 430, it may be determined if the battery of the system is charged to the full capacity or above a second threshold capacity. If the battery of the system is charged to the full capacity or above the second threshold capacity, the method may proceed to 410, according to one or more embodiments. If the battery of the system is not charged to the full capacity or above the second threshold capacity, access of reserved energy capacity may be permitted, at 435.

At 440, the battery of the system may be discharged utilizing the reserved energy capacity. At 445, it may be determined if the reserved energy has been utilized. If the reserved energy has been utilized, the method may proceed to 410, according to one or more embodiments. If the reserved energy has not been utilized, the method may proceed to 430, according to one or more embodiments.

Figure 5:
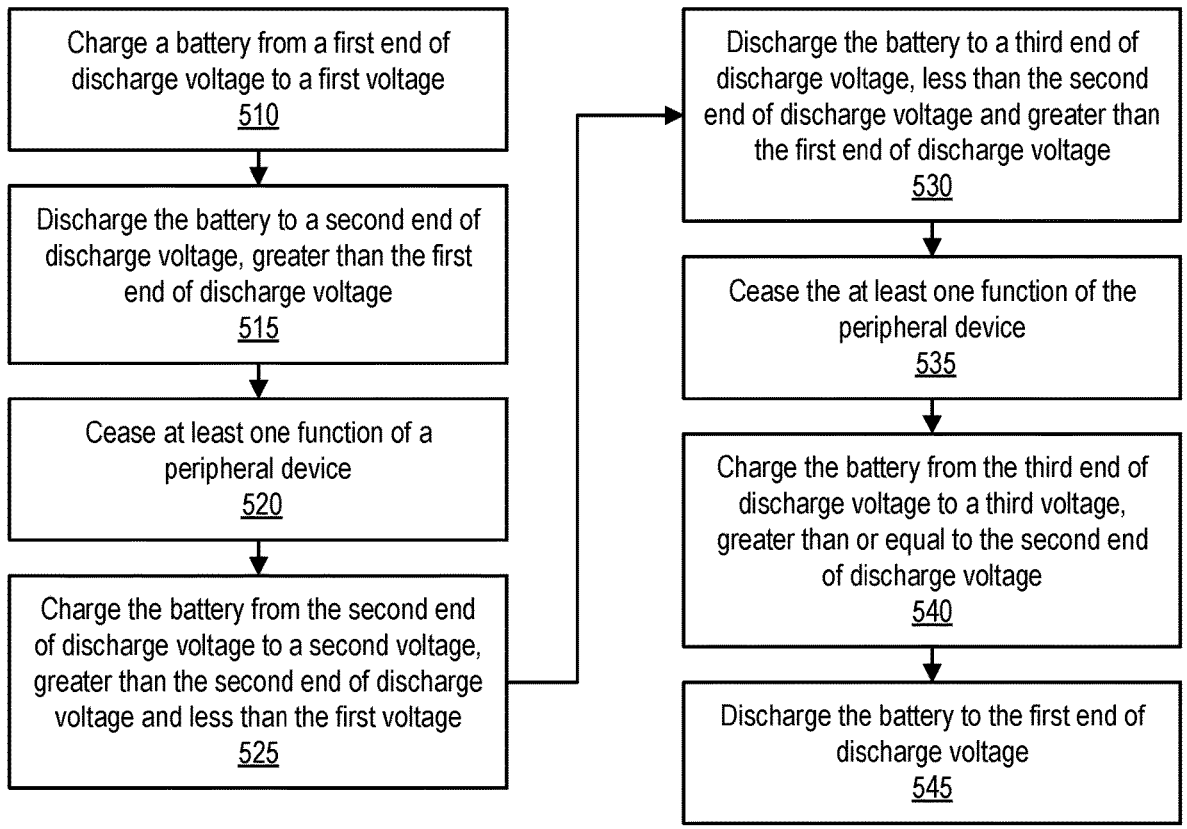
FIG. 5 illustrates another example of a method of utilizing a battery of a system, according to one or more embodiments.

Turning now to FIG. 5, another example of a method of utilizing a battery of a system is illustrated, according to one or more embodiments. At 510, a battery may be charged from a first end of discharge voltage to a first voltage. For example, battery 285 may be charged from voltage 310 to voltage 312. At 515, the battery may be discharged to a second end of discharge voltage, greater than the first end of discharge voltage. For example, battery 285 may be discharged to voltage 314.

In one or more embodiments, the system may be or include peripheral device 190. For example, discharging battery 285A may include providing power from battery 285A to one or more components of peripheral device 190. For instance, discharging battery 285A may include providing power from battery 285A to one or more of processor 220, volatile memory medium 250, non-volatile memory medium 270, and interface 280, among others, of peripheral device 190. In one or more embodiments, the system may be or include IHS 110. For example, discharging battery 285B may include providing power from battery 285B to one or more components of IHS 110. For instance, discharging battery 285B may include providing power from battery 285B to one or more of processor 120, volatile memory medium 150, non-volatile memory medium 160, non-volatile memory medium 170, I/O subsystem 175, and network interface 175, among others, of IHS 110.

At 520, at least one function of the system may be ceased. In one or more embodiments, the system may be a wireless system. As an example, the wireless system may include a wireless interface coupled to the battery and configured to wirelessly communicate peripheral data with an information handling system. In one or more embodiments, ceasing at least one function of the system may be performed in response to discharging the battery to the second end of discharge voltage.

At 525, the battery may be charged from the second end of discharge voltage to a second voltage, greater than the second end of discharge voltage and less than the first voltage. For example, battery 285 may be charged from voltage may be charged to voltage 316. At 530, the battery may be discharged to a third end of discharge voltage, less than the second end of discharge voltage and greater than the first end of discharge voltage. For example, battery 285 may be discharged to voltage 318.

At 535, the at least one function of the system may be ceased. In one or more embodiments, the at least one function of the system may be ceased in response to discharging the battery to the third end of discharge voltage. At 540, the battery may be charged from the third end of discharge voltage to a third voltage, greater than or equal to the second end of discharge voltage. In one example, battery 285 may be charged from voltage 318 to voltage 314. In another example, battery 285 may be charged from voltage 318 to a voltage greater than voltage 314. At 545, the battery may be discharged to the first end of discharge voltage. For example, battery 285 may be discharged to voltage 310.

In one or more embodiments, the battery may include a battery management unit. For example, the battery management unit may measure a first present voltage. For instance, the first present voltage may be a voltage of battery 285 at a first time when the battery management unit measures the voltage of battery 285. In one or more embodiments, the battery management unit may include an analog to digital converter (ADC), which may convert a voltage of battery 285 into digital values that may be utilized by the battery management unit. For example, the ADC may measure the first present voltage. In one or more embodiments, the battery management unit may determine that the first present voltage is the second end of discharge voltage or the third end of discharge voltage. In one or more embodiments, the battery management unit may cease providing power to the system. For example, the battery management unit may cease providing power to the system in response to determining that the first present voltage is the second end of discharge voltage or the third end of discharge voltage.

In one or more embodiments, the first present voltage may be the second end of discharge voltage. For example, the battery management unit may measure a second present voltage of the battery. For instance, the second present voltage may be a voltage of battery 285 at a second time, after the first time, when the battery management unit measures the voltage of battery 285. In one or more embodiments, the ADC may measure the second present voltage of the battery. In one or more embodiments, the battery management unit may determine that the second present voltage is the second voltage. For example, the battery management unit may permit the battery to provide power to the system. For instance, the battery management unit may permit the battery to provide power to the system in response to determining that the second present voltage is the second voltage.

In one or more embodiments, the battery may include one or more lithium-ion cells. In one or more embodiments, the battery may include circuitry that may measure a first present voltage of the one or more lithium-ion cells. For example, the circuitry may include an ADC. For instance, the ADC may measure a first present voltage of the one or more lithium-ion cells. In one or more embodiments, the first present voltage may be a voltage of the one or more lithium-ion cells at a first time when the circuitry measures the voltage of the one or more lithium-ion cells.

In one or more embodiments, the circuitry may determine that the first present voltage is the first end of discharge voltage. For example, the circuitry may withhold power from the one or more lithium-ion cells to the system to prevent damage to the one or more lithium-ion cells. For instance, the circuitry may withhold power from the one or more lithium-ion cells in response to determining that the first present voltage is the first end of discharge voltage. In one or more embodiments, the circuitry may include a battery management unit.

In one or more embodiments, it may be determined that a present voltage of the battery is the second end of discharge voltage. For example, the system may indicate that the system needs to be coupled to a power source. For instance, the system may indicate that the system needs to be coupled to a power source in response to determining that the present voltage of the battery is the second end of discharge voltage. In one or more embodiments, indicating that the system needs to be coupled to a power source may include emitting light emissions and/or providing at least one sound. In one example, emitting light emissions may include displaying information via a display. In another example, emitting light emissions may include illuminating a light emitting diode (LED).

Figure 6:
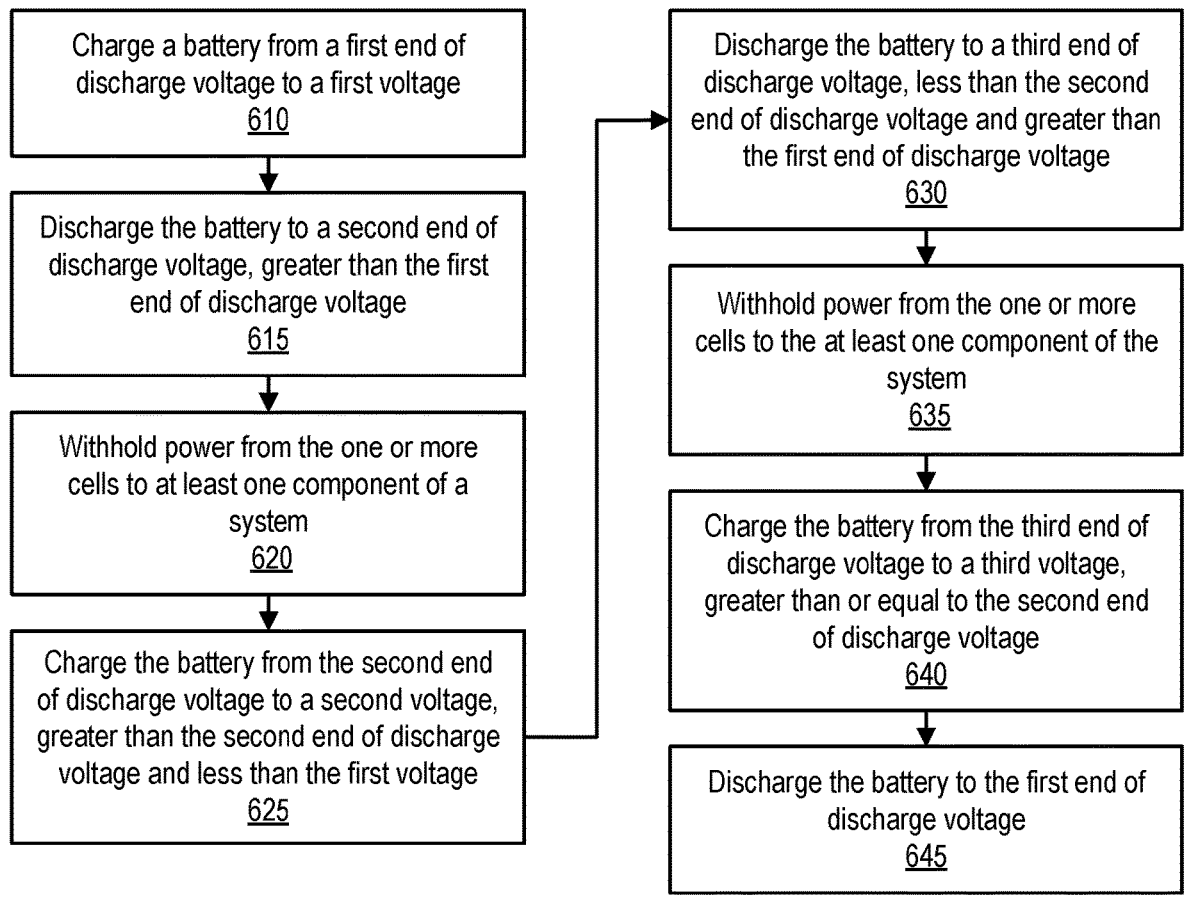
FIG. 6 illustrates an example of a method of utilizing a battery, according to one or more embodiments.

Turning now to FIG. 6, an example of a method of utilizing a battery is illustrated, according to one or more embodiments. At 610, a battery may be charged from a first end of discharge voltage to a first voltage. For example, battery 285 may be charged from voltage 310 to voltage 312. For instance, circuitry 286 may be configured to charge battery 285 from a first end of discharge voltage to a first voltage. In one or more embodiments, the battery may include one or more cells (e.g., one or more of cells 288A-288C). For example, the one or more cells may be charged from a first end of discharge voltage to a first voltage. For instance, circuitry 286 may be configured to charge the one or more cells from a first end of discharge voltage to a first voltage. In one or more embodiments, battery 285 may be charged via power source 290. For example, the one or more cells (e.g., one or more of cells 288A-288C) may be charged via power source 290.

At 615, the battery may be discharged to a second end of discharge voltage, greater than the first end of discharge voltage. For example, battery 285 may be discharged to voltage 314. For instance, circuitry 286 may be further configured to discharge the battery to a second end of discharge voltage. In one or more embodiments, circuitry 286 may be further configured to discharge battery 285 to a second end of discharge voltage. For example, circuitry 286 may be further configured to discharge the one or more cells to a second end of discharge voltage. In one or more embodiments, discharging battery 285 may include providing power from battery 285 to one or more components of peripheral device 190. For example, discharging battery 285 may include providing power from battery 285 to one or more of processor 220, volatile memory medium 250, non-volatile memory medium 270, and interface 280, among others, of peripheral device 190.

At 620, power from the one or more cells to at least one component of a system may be withheld. In one or more embodiments, the system may be or include at least one of an information handling system and a peripheral device. For example, circuitry 286 may be further configured to withhold power from the one or more cells to at least one component of a system. In one instance, circuitry 286 may be further configured to withhold power from the one or more cells to at least one of processor 220, volatile memory medium 250, non-volatile memory medium 270, and interface 280, among others, of peripheral device 190. In another instance, circuitry 286 may be further configured to withhold power from the one or more cells to at least one of processor 120, volatile memory medium 150, non-volatile memory medium 160, non-volatile memory medium 170, I/O subsystem 175, and network interface 175, among others, of IHS 110. In one or more embodiments, circuitry 286 may be further configured to withhold power from the one or more cells to at least one component of a system in response to discharging the battery to the second end of discharge voltage.

At 625, the battery may be charged from the second end of discharge voltage to a second voltage, greater than the second end of discharge voltage and less than the first voltage. For example, battery 285 may be charged from voltage may be charged to voltage 316. For instance, circuitry 286 may be further configured to charge battery 286, from the second end of discharge voltage to a second voltage, greater than the second end of discharge voltage and less than the first voltage. In one or more embodiments, circuitry 286 may be further configured to charge the one or more cells from the second end of discharge voltage to a second voltage, greater than the second end of discharge voltage and less than the first voltage. For example, circuitry 286 may be further configured to charge the one or more cells to voltage 316.

At 630, the battery may be discharged to a third end of discharge voltage, less than the second end of discharge voltage and greater than the first end of discharge voltage. For example, battery 285 may be discharged to voltage 318. For instance, circuitry 286 may be further configured to discharge battery 285 to a third end of discharge voltage. In one or more embodiments, circuitry 286 may be further configured to discharge the one or more cells to a third end of discharge voltage. For example, circuitry 286 may be further configured to discharge the one or more cells to voltage 318.

At 635, power from the one or more cells to the at least one component of the system may be withheld. For example, circuitry 286 may be further configured to withhold power from the one or more cells to the at least one component of the system. In one or more embodiments, circuitry 286 may be further configured to withhold power from the one or more cells to the at least one component of the system in response to discharging the battery to the third end of discharge voltage.

At 640, the battery may be charged from the third end of discharge voltage to a third voltage, greater than or equal to the second end of discharge voltage. In one example, battery 285 may be charged from voltage 318 to voltage 314. In another example, battery 285 may be charged from voltage 318 to a voltage greater than voltage 314. In one or more embodiments, circuitry 286 may be further configured to charge battery 285 from the third end of discharge voltage to a third voltage, greater than or equal to the second end of discharge voltage. For example, circuitry 286 may be further configured to charge the one or more cells from the third end of discharge voltage to a third voltage, greater than or equal to the second end of discharge voltage.

At 645, the battery may be discharged to the first end of discharge voltage. For example, battery 285 may be discharged to voltage 310. For instance, circuitry 286 may be further configured to discharge battery 285 to the first end of discharge voltage. In one or more embodiments, circuitry 286 may be further configured to discharge the one or more cells to the first end of discharge voltage.

In one or more embodiments, circuitry 286 may include a battery management unit. For example, the battery management unit may be configured to: measure a first present voltage; determine that the first present voltage is the second end of discharge voltage or the third end of discharge voltage; and in response to determining that the first present voltage is the second end of discharge voltage or the third end of discharge voltage, withhold power from the one or more cells to the at least one component of the system. For instance, circuitry 286 may include an ADC. In one or more embodiments, the ADC may convert a voltage of battery 285 or a voltage of a cell of battery 285 into digital values that may be utilized by the battery management unit or by the circuitry. For example, the ADC may measure a first present voltage.

In one or more embodiments, the one or more cells may include respective one or more lithium-ion cells. For example, circuitry 286 may be further configured to: measure a first present voltage of the one or more; determine that the first present voltage is the first end of discharge voltage; and withhold power from the one or more lithium-ion cells to the at least one component of the system to prevent damage to the one or more lithium-ion cells.

In one or more embodiments, circuitry 286 may be further configured to: determine that a present voltage of the battery is the second end of discharge voltage; and in response to determining that the present voltage of the battery is the second end of discharge voltage, indicate that the system needs to be coupled to a power source.

In one or more embodiments, indicating that the system needs to be coupled to a power source may include emitting light emissions and/or providing at least one sound. In one example, emitting light emissions may include displaying information via a display. In another example, emitting light emissions may include illuminating a LED. In one or more embodiments, indicating that the system needs to be coupled to a power source may include providing information to a processor, which indicates that the system needs to be coupled to a power source. In one example, indicating that the system needs to be coupled to a power source may include providing information to processor 220, which indicates that the peripheral device needs to be coupled to a power source. In another example, indicating that the system needs to be coupled to a power source may include providing information to processor 120, which indicates that the system needs to be coupled to a power source.

In one or more embodiments, access of the reserve energy of a battery may be provided to a system via one or more switches. In one example, a switch may be actuated. For example, access of the reserve energy of the battery may be provided to the system in response to determining that the switch was actuated. In another example, a combination of switches may be actuated. For example, access of the reserve energy of the battery may be provided to the system in response to determining that the combination of switches was actuated. In one or more embodiments, access of the reserve energy of a battery may be provided to a system via instructions executable by a processor. For example, the instructions executable by the processor may provide access of the reserve energy of the battery to the system.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
a battery that includes one or more cells;
wherein the system is configured to:
    charge the battery from a first end of discharge voltage to a first voltage;
    discharge the battery to a second end of discharge voltage, greater than the first end of discharge voltage;
    in response to discharging the battery to the second end of discharge voltage, cease at least one function of the system;
    charge the battery from the second end of discharge voltage to a second voltage, greater than the second end of discharge voltage and less than the first voltage;
    discharge the battery to a third end of discharge voltage, less than the second end of discharge voltage and greater than the first end of discharge voltage;
    in response to discharging the battery to the third end of discharge voltage, cease the at least one function of the system;
    charge the battery from the third end of discharge voltage to a third voltage, greater than or equal to the second end of discharge voltage; and
    discharge the battery to the first end of discharge voltage.

2. The system of claim 1,
wherein the battery includes a battery management unit; and
wherein the battery management unit is configured to:
    measure a first present voltage;
    determine that the first present voltage is the second end of discharge voltage or the third end of discharge voltage; and
    cease providing power to the system.

3. The system of claim 2,
wherein the first present voltage is the second end of discharge voltage; and
wherein the battery management unit is further configured to:
    measure a second present voltage of the battery;
    determine that the second present voltage is the second voltage; and
    in response to determining that the second present voltage is the second voltage, permit the battery to provide power to the system.

4. The system of claim 1, wherein the system is a wireless peripheral device that includes a wireless interface coupled to the battery and configured to wirelessly communicate peripheral data with an information handling system.

5. The system of claim 1, wherein the system is an information handling system.

6. The system of claim 1,
wherein the battery includes one or more lithium-ion cells; and
wherein the battery includes circuitry configured to:
measure a first present voltage of the one or more lithium-ion cells;
determine that the first present voltage is the first end of discharge voltage; and
withhold power from the one or more lithium-ion cells to the system to prevent damage to the one or more lithium-ion cells.

7. The system of claim 1, wherein the system is further configured to:
determine that a present voltage of the battery is the second end of discharge voltage; and
in response to determining that the present voltage of the battery is the second end of discharge voltage, indicate that the system needs to be coupled to a power source.

8. A method, comprising:
charging, from a first end of discharge voltage to a first voltage, a battery of a system;
discharging the battery to a second end of discharge voltage, greater than the first end of discharge voltage;
in response to the discharging the battery to the second end of discharge voltage, ceasing at least one function of the system;
charging the battery from the second end of discharge voltage to a second voltage, greater than the second end of discharge voltage and less than the first voltage;
discharging the battery to a third end of discharge voltage, less than the second end of discharge voltage and greater than the first end of discharge voltage;
in response to the discharging the battery to the third end of discharge voltage, performing the ceasing the at least one function of the system;
charging the battery from the third end of discharge voltage to a third voltage, greater than or equal to the second end of discharge voltage; and
discharging the battery to the first end of discharge voltage.

9. The method of claim 8, further comprising:
a battery management unit of the battery measuring a first present voltage;
the battery management unit determining that the first present voltage is the second end of discharge voltage or the third end of discharge voltage; and
the battery management unit ceasing providing power to the system.

10. The method of claim 9, wherein the first present voltage is the second end;
the method further comprising:
the battery management unit measuring a second present voltage of the battery;
the battery management unit determining that the second present voltage is the second voltage; and
in response to the battery management unit determining that the second present voltage is the second voltage, the battery management unit permitting the battery to provide power to the system.

11. The method of claim 8, wherein the system is a peripheral device configured to wirelessly communicate with an information handling system;
the method further comprising:
the peripheral device wirelessly communicating with the information handling system.

12. The method of claim 8, wherein the system is an information handling system.

13. The method of claim 8, wherein the battery includes one or more lithium-ion cells;
the method further comprising:
a circuitry of the battery measuring a first present voltage of the one or more;
the circuitry determining that the first present voltage is the first end of discharge voltage; and
the circuitry withholding power from the one or more lithium-ion cells to the system to prevent damage to the one or more lithium-ion cells.

14. The method of claim 8, further comprising:
determining that a present voltage of the battery is the second end of discharge voltage; and
in response to the determining that the present voltage of the battery is the second end of discharge voltage, indicating that the system needs to be coupled to a power source.

15. A battery, comprising:
one or more cells; and
circuitry coupled to the one or more cells;
wherein the circuitry is configured to:
charge the battery from a first end of discharge voltage to a first voltage;
discharge the battery to a second end of discharge voltage, greater than the first end of discharge voltage;
in response to discharging the battery to the second end of discharge voltage, withhold power from the one or more cells to at least one component of a system;
charge the battery from the second end of discharge voltage to a second voltage, greater than the second end of discharge voltage and less than the first voltage;
discharge the battery to a third end of discharge voltage, less than the second end of discharge voltage and greater than the first end of discharge voltage;
in response to discharging the battery to the third end of discharge voltage, withhold power from the one or more cells to the at least one component of the system;
charge the battery from the third end of discharge voltage to a third voltage, greater than or equal to the second end of discharge voltage; and
discharge the battery to the first end of discharge voltage.

16. The battery of claim 15,
wherein the circuitry include a battery management unit; and
wherein the battery management unit is configured to:
measure a first present voltage;
determine that the first present voltage is the second end of discharge voltage or the third end of discharge voltage; and
in response to determining that the first present voltage is the second end of discharge voltage or the third end of discharge voltage, withhold power from the one or more cells to the at least one component of the system.

17. The battery of claim 16,
wherein the first present voltage is the second end of discharge voltage; and
wherein the battery management unit is further configured to:
measure a second present voltage of the battery;
determine that the second present voltage is the second voltage; and in response to determining that the second present voltage is the second voltage, permit the battery to provide power the at least one component of the system.

18. The battery of claim 15,
wherein the one or more cells include respective one or more lithium-ion cells; and
wherein the circuitry is further configured to:
  measure a first present voltage of the one or more;
  determine that the first present voltage is the first end of discharge voltage; and
  withhold power from the one or more lithium-ion cells to the at least one component of the system to prevent damage to the one or more lithium-ion cells.

19. The battery of claim 18, wherein the system is a wireless peripheral device.

20. The battery of claim 15, wherein the system is an information handling system.

\* \* \* \* \*